United States Patent [19]
Amakawa et al.

[11] Patent Number: 5,398,109
[45] Date of Patent: Mar. 14, 1995

[54] APPARATUS AND METHOD FOR CORRECTING COLOR IMAGE DATA ACCORDING TO A MASKING EQUATION

[75] Inventors: Katsumi Amakawa, Nara; Haruo Yamamoto; Shuji Hayashi, both of Osaka, all of Japan

[73] Assignee: Mita Industrial Co., Ltd., Japan

[21] Appl. No.: 847,936

[22] Filed: Mar. 6, 1992

[30] Foreign Application Priority Data

Mar. 12, 1991 [JP] Japan .................................. 3-073945
Mar. 30, 1991 [JP] Japan .................................. 3-093309

[51] Int. Cl.$^6$ .......................................... G03G 15/01
[52] U.S. Cl. .................................. 355/327; 358/517; 358/523
[58] Field of Search ............ 355/326, 327, 208; 346/157; 358/296, 300, 515, 517, 518, 523

[56] References Cited

U.S. PATENT DOCUMENTS 3,977,007  8/1976  Berry et al. ................. 340/75 X
4,060,829 11/1977  Sakamoto ...................... 358/80
4,789,892 12/1988  Tsuzuki et al. .................. 358/80
5,162,925 10/1992  Takaoka et al. ................ 358/447

FOREIGN PATENT DOCUMENTS 410719   1/1991  European Pat. Off. .
4-67389  9/1984  Japan .
2217140 10/1989  United Kingdom .

OTHER PUBLICATIONS

A. R. Harbury, "A Color-Corrected Halftone Algorithm for Bilevel Printers", *1989 SID International Symposium: Digest of Technical Papers*, vol. XX, Baltimore Md., U.S, pp. 90–93 (May 1989).

Primary Examiner—Leo P. Picard
Assistant Examiner—Christopher Horgan
Attorney, Agent, or Firm—Beveridge, DeGrandi, Weilacher & Young

[57] ABSTRACT

In a color correcting method for use in a color image forming apparatus, color image data are calculated and then corrected by solving a masking equation by allotting the tone number of input image data according to the value of each coefficient of reflection density of each of three primary colors in the masking equation.

14 Claims, 10 Drawing Sheets

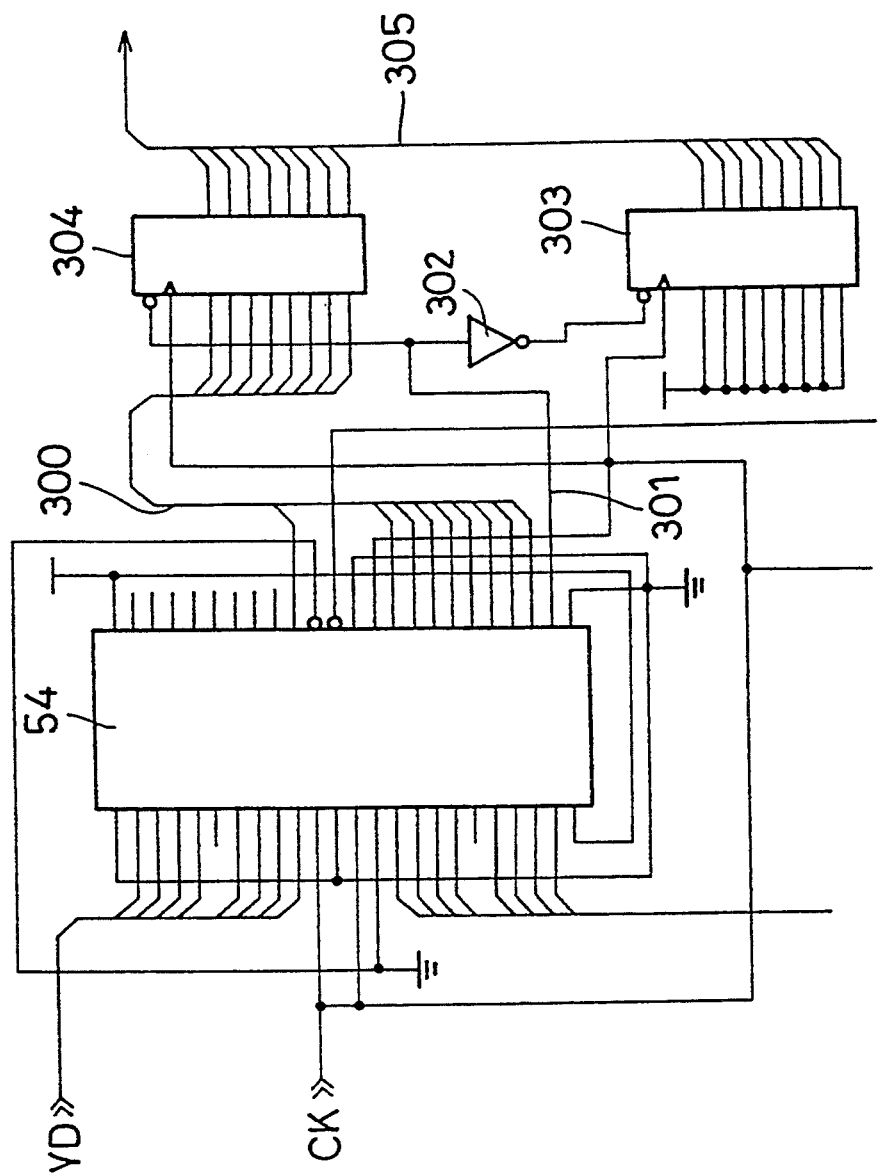

APPARATUS AND METHOD FOR CORRECTING COLOR IMAGE DATA ACCORDING TO A MASKING EQUATION

BACKGROUND OF THE INVENTION

1. Field of the Invention

The present invention relates to a color image forming apparatus and a color correcting method for use in a color image forming apparatus, and more specifically, to a color image forming apparatus such as a digital color copying machine utilizing a masking method for toner color correction and a color correcting method for use therein.

2. Description of the Prior Art

In a conventional digital color copying machine, first, a light beam reflected from an original image is directed by a color scanner to a sensor having red, green and blue (hereinafter referred to as R, B G and B, respectively) spectral characteristics shown in FIG. 6, and formed into an R, G and B data.

The R, G and B data are, for example, before outputted to a printer portion of the copying machine, converted into data of yellow, magenta and cyan (hereinafter referred to as Y, M and C, respectively) which are complementary colors of R, G and B. The amounts (main densities) of Y, M and C toner provided onto a photoreceptor drum are determined according to the amount of reflection energy shown by the Y, M and C data. The main densities of the toner of Y, M and C which are complimentary colors of R, G and B are obtained by the following equations (1) to (3):

$$[Y] = 1 - [B] \quad (1)$$

$$[M] = 1 - [G] \quad (2)$$

$$[C] = 1 - [R] \quad (3)$$

wherein:
- [R] is a reflectance of R of an original image;
- [G] is a reflectance of G of an original image;
- [B] is a reflectance of B of an original image;
- [Y] is a main density of Y toner;
- [M] is a main density of M toner; and
- [C] is a main density of C toner.

In practice, each toner has a spectral characteristic shown in FIG. 7. However, the above-mentioned equations (1) to (3) are premised on an assumption that each toner has an ideal spectral characteristic. For example, in a case of the M toner, the ideal spectral characteristic is M1 shown in FIG. 8. However, the M toner actually has a spectral characteristic M2 shown in FIG. 8. For this reason, a black image is formed if a processing of the color image data is made according to the equations (1) to (3).

To avoid this, a toner color correction is required.

In a digital color image forming apparatus, the toner color correction is made, for example, by a method where a color correction table of each of Y, M and C is used and a masking process is employed. In the method, each of the Y, M and C data are substituted in each masking equation, and a Y, M and C correction data which are automatically determined on determination of the Y, M and C data are provided as tables.

By this method, however, since processing is executed by use of data of 256 tones made by dividing each Y, M and C analog data into 256 tones, a large-capacity memory of 16 mega-byte for each color will be required if the tables are made of the Y, M and C data which are full data of 256 tones.

The use of the large-capacity memory results in a higher cost of the apparatus, more complicated circuit arrangement and reduction of processing speed. On the other hand, if the tone number is decreased so that a small-capacity memory is used, image reproducibility will deteriorate.

SUMMARY OF THE INVENTION

An object of the present invention is to provide a color image forming apparatus and a color correcting method for use in a color image forming apparatus where a toner color correction can adequately be made by use of a small capacity memory.

Another object of the present invention is to provide a color correcting circuit for use in a color image forming apparatus which properly copes with various conditions (such as the development condition, the condition of a light receiving device for reading an original, etc.) to provide an excellent color correction.

To achieve the above-mentioned object, in a color correcting method for use in a color image forming apparatus according to the present invention, color image data is calculated which is corrected by solving a masking equation by allotting the tone number of input image data according to the value of each coefficient, of the reflection densities of three primary colors, constituting the masking equation.

Moreover, a color image forming apparatus according to the present invention comprises: a semiconductor memory device in which a color image data corrected by solving a masking equation by allotting the tone number of an input image data according to the value of each coefficient of the reflection densities of three primary colors constituting the masking equation is stored in an address which is in accordance with the tone number; means for producing an address signal corresponding to the tone number from a main color image data and a sub color image data inputted; and means for reading-out a color image data from the semiconductor memory device by use of the address signal and outputting the color image data.

Further, in an image forming apparatus according to the present invention, with respect to main color image data of image data of three primary colors constituting a color image and the other two color image data, a color correction table data previously stored in a semiconductor memory device is read-out according to the value of the input color image data, the table data which was read-out is used as an image formation data, and each of the input color image data is used for reading-out the table data stored in the semiconductor memory device after processed by a multiplier having a predetermined multiplication coefficient for fine adjustment.

BRIEF DESCRIPTION OF THE DRAWINGS

These and other objects and features of this invention will become clear from the following description taken in conjunction with the preferred embodiments with reference to the accompanied drawings in which:

FIG. 11 is a view showing a limiting feature for a case where a data having a value equal to or larger than the maximum value is inputted to the multiplier.

DESCRIPTION OF THE PREFERRED EMBODIMENT

Figure 1:
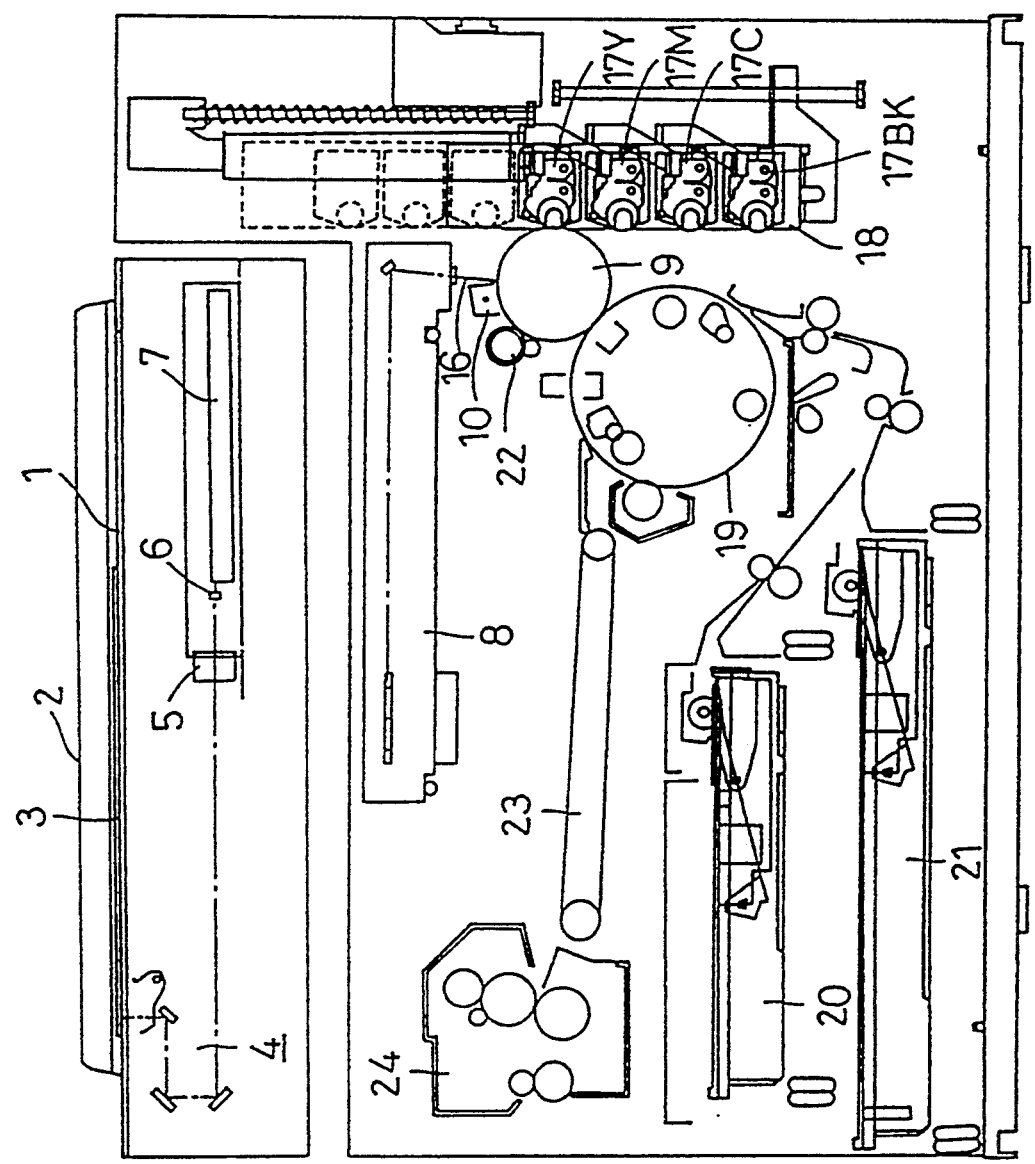
FIG. 1 is a schematic view of a digital color electrophotographic copying machine embodying the present invention.

The present invention will hereinafter be described as applied to a digital color electrophotographic copying machine shown in FIG. 1. In FIG. 1, an image of an original 3 placed on a contact glass 1 so as to be pressed down by an original cover 2 is scanned by a scanning optical system 4. Image information thereof is directed through light serving as a medium from a condenser lens 5 to a light receiving device 6 such as a CCD. After being converted into an electric signal it is signal-processed by an image processing portion 7. Thereafter, it is formed into a latent image on a photoreceptor drum 9 by a laser scanner unit (LSU) 8. Prior to this, the surface of the photoreceptor drum 9 is charged by a main charger (charging portion) 10.

Figure 2:
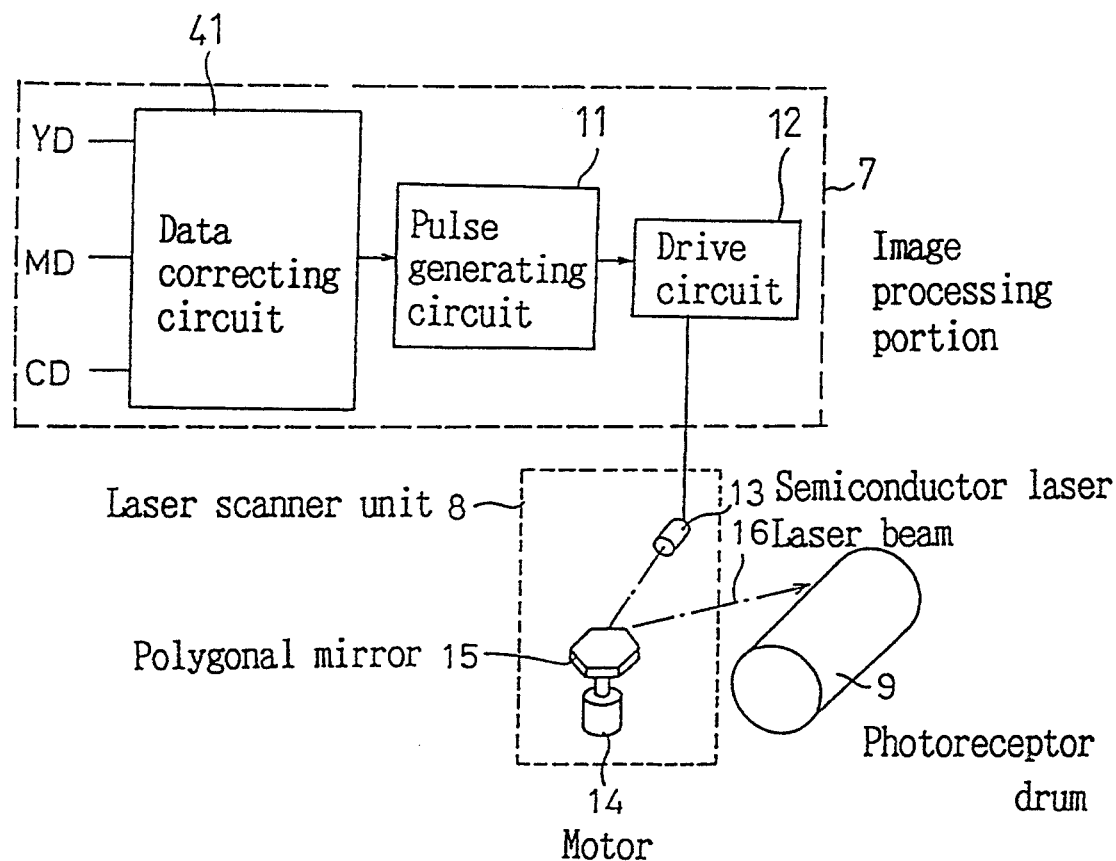
FIG. 2 is a schematic view of an image data processing portion and an image forming portion of the electrophotographic copying machine of FIG. 1.

FIG. 2 shows main portions of the image processing portion 7 and laser scanner unit 8 and a relationship therebetween. In the image processing portion 7, the input color image data YD, MD and CD are corrected by data correcting circuit 41, and a pulse having a width which is in accordance with the values of the image data is outputted by a pulse generating circuit 11 based on the values of the color image data corrected by the data correcting circuit 41. By this pulse, a semiconductor laser 13 of the laser scanner unit 8 is activated through a drive circuit 12 to irradiate a laser beam 16. The laser beam 16 scans the surface of the photoreceptor drum 9 through a polygonal mirror 15 rotated by a motor 14 to form a latent image on the surface of the photoreceptor drum 9.

In a case where a full-color image is formed, first, a latent image is formed on the surface of the photoreceptor drum 9 by the laser beam 16 based on a color image data of yellow, and the latent image is developed by a Y developer unit 17Y. The developer unit 17Y contains yellow toner, and develops the latent image on the photoreceptor drum 9 with the yellow toner. Then, the image on the photoreceptor drum 9 developed with the yellow toner is transferred onto a sheet of paper arranged to wind around the surface of a transferring drum 19. The sheet is supplied from a paper feed cassette 20 or 21 via a paper feed path.

The sheet is left attached to the surface of the transferring drum after the yellow image is transferred thereon so that an image of a next color is transferred thereon.

After a cleaning of residual toner by a cleaning portion 22 and a discharging by a discharger (not shown), the photoreceptor drum 9 is again charged by the main charger 10. Then, a latent image corresponding to a magenta image on the photoreceptor drum formed by the laser beam 16 based on color image data of magenta is developed by an M developer unit 17M. At this time, the M developer unit 17M is brought to a development position opposite to the photoreceptor drum 9 in place of the Y developer unit 17Y.

In this embodiment, as developer units, the Y developer unit 17Y for development of yellow images, the M developer unit 17M for development of magenta images, a C developer unit 17C for development of cyan images and a BK developer unit 17BK for development of black images are successively attached as shown in the figure in a vertical direction on a moving body 18 which moves in vertical directions. The developer units 17Y, 17M, 17C and 17BK are alternatively brought to a development position (the position opposite to the photoreceptor drum 9) according to the color image data for forming a latent image by a laser beam 16.

The image on the photoreceptor drum 9 developed with magenta toner is transferred onto the sheet (the sheet where the yellow image has been transferred) on the surface of the transferring drum 19. Similar operations are repeated to transfer cyan and black images onto the sheet to form a full-color image. Thereafter, the sheet where the full-color image has formed is separated from the transferring drum 19, conveyed to a fusing portion 24 by a conveying portion 23, and fixed by the fusing portion 24 to be discharged from the electrophotographic copying machine.

Figure 3:
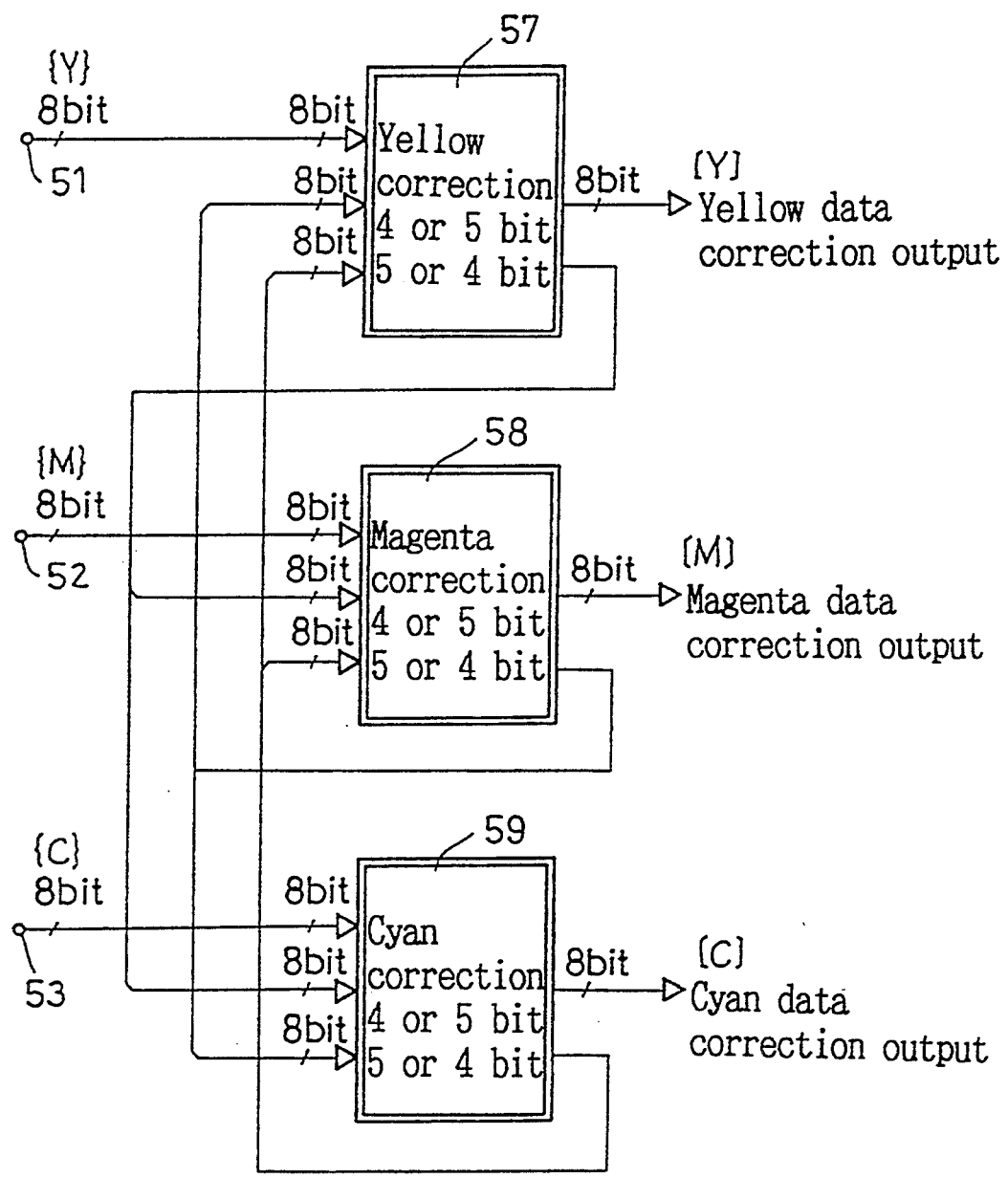
FIG. 3 is a block diagram showing a data correcting circuit of FIG. 2.

The data correcting circuit shown in FIG. 3 includes correcting circuits 57, 58 and 59. The correcting circuit 57 is a Y correcting circuit whose main color image data is the yellow data. Similarly, the correcting circuits 58 and 59 are an M correcting circuit and a C correcting circuit whose main color image data are the magenta data and the cyan data, respectively. Since the correcting circuits 57, 58 and 59 have the same arrangement, only the details of the Y correcting circuit 57 will hereinafter be described with reference to FIG. 4.

Figure 4:
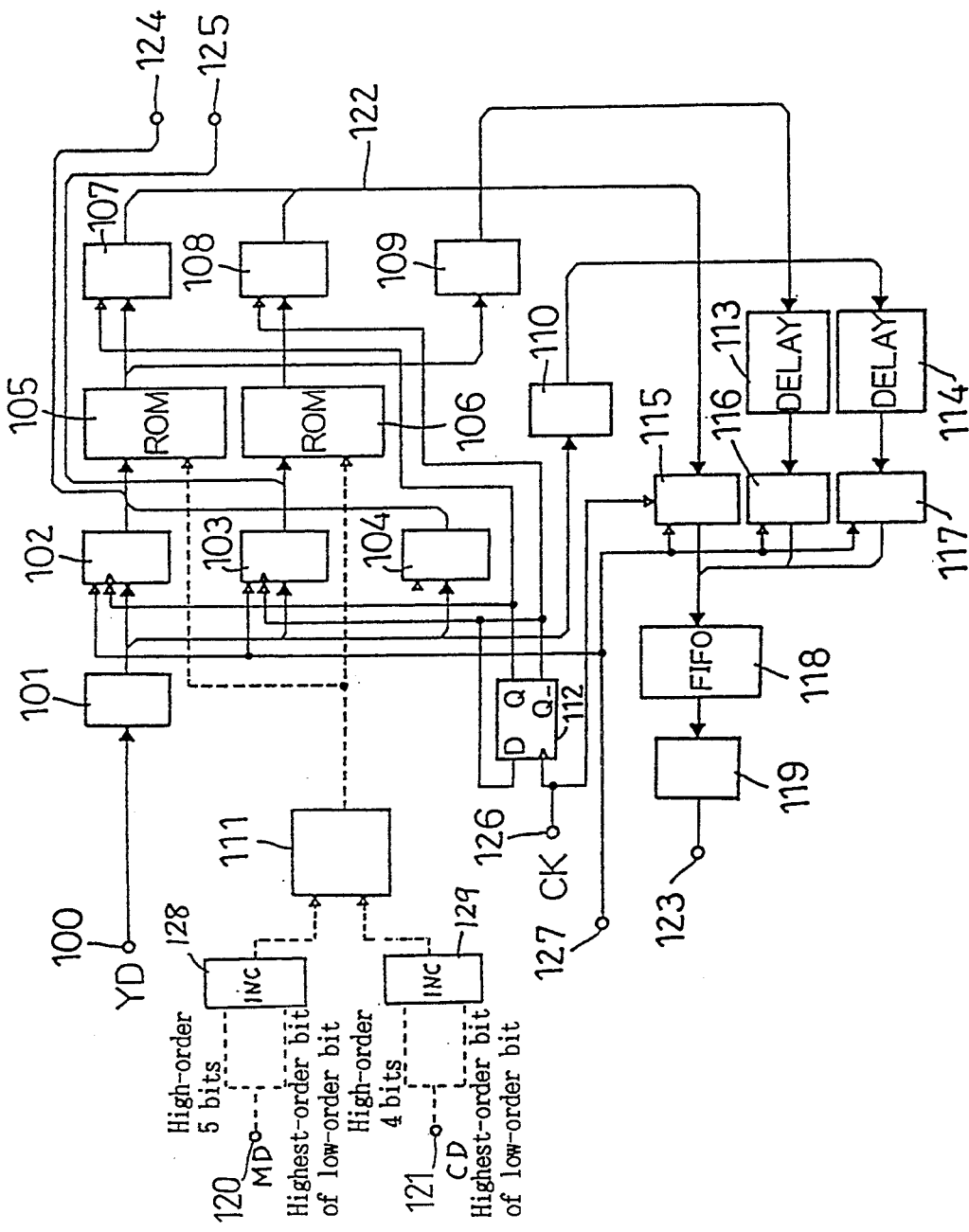
FIG. 4 is a detail view of a Yellow correction circuit of FIG. 3.

In FIG. 4, the numerals 101 to 104, 107 to 110, 115 to 117 and 119 are latch circuits consisting of integrated circuits (ICs) and used in order to synchronize data. The yellow color image data YD entered through an input terminal 100 is input via the latch circuits 101, 102 and 103 into a first ROM 105 and a second ROM 106. On the other hand, the 8-bit magenta and cyan color image data MD and CD provided via input terminals 120 and 121 from the M correcting circuit 58 and the C correcting circuit 59 of FIG. 3 are provided to a selector 111 via increment determining circuits 128 and 129, and converted into a 5-bit data and a 4-bit data, respectively, by the selector 111 to be supplied into the first and second ROMs 105 and 106.

At the increment determining circuit 128, a value represented by the high-order 5 bits of the magenta color image data MD consisting of 8 bits is amended by the value of a highest-order bit of the low-order bits (i.e. a sixth bit). Specifically, if the sixth bit is 1, incrementing (carry) is made, and if it is 0, incrementing is not made. Similarly, in the increment determining circuit 129, with respect to a value represented by the high-order 4 bits of the cyan color image data; CD consisting of 8 bits, incrementing is made if the digit of a highest-order bit of the low-order bits (in this case, a fifth bit) is 1, and incrementing is not made if the digit is 0. The high-order 5 bits of the MD data and the high-order 4 bits of the CD data thus processed are provided from the selector 111 to the first and second ROMs 105 and 106, respectively. The image data thus processed and output from the selector 111 may be provided to the ROMs 105 and 106 while remaining in 8-bit form.

The increment determining circuits 128 and 129 may be deleted so that the color image data MD and CD are used without making any incrementing.

A data which is previously color-corrected is stored as a table data in each of the first and second ROMs 105 and 106. A data value having already been corrected is read-out from the table data by use of the input color data as address data.

The corrected yellow color image data thus output from the first and second ROMs 105 and 106 are synchronized with a clock having a frequency one-half of the frequency of a clock CK by the latch circuits 107 and 108, added to each other on a line 122 and provided to a line buffer 118 via the latch circuit 115 which operates in response to the clock CK. The line buffer 118 is, although is not limited to, a buffer of first in first out type. The output of the line buffer 118 is directed to an output terminal 123 via the latch circuit 119 and provided to the pulse generating circuit 11 FIG. 2.

The 8-bit yellow color image data directed from the latch circuits 103 and 104 to output terminals 124 and 125 are provided to the M correcting circuit 58 and the C correcting circuit 59 of FIG. 3, respectively. The 8-bit magenta color image data MD and cyan color image data CD to be supplied to input terminals 120 and 121 are outputted to output terminals of the M and C correcting circuits 58 and 59 corresponding to the output terminals 124 and 125 of the Y correcting circuit 57.

In FIG. 4, the numeral 112 is a flip-flop circuit which receives the clock CK through an input terminal 126 and provides a clock having a frequency one-half of the frequency of the clock CK to the latch circuits 102 to 104 and 107 to 109. Since the latch circuits 115 to 117 operate in response to the clock CK, the clock is directly provided from the input terminal 126 without passing through the flip-flop 112.

In this embodiment, two ROMs (the first ROM 105 and the second ROM 106) are used for storing the correction data. Since the clock CK inputted into the input terminal 126 is generally a high speed clock which cannot be coped with only by one normal ROM, two ROMs are used so that the reading speed can be reduced to half. When a ROM capable of high-speed operation is used, one of the first and second ROMs 105 and 106 is used, or only one ROM is provided. The numeral 113 is a delay circuit for restricting an output of a ROM when only one ROM is used. For example, when only the first ROM 105 is used, it delays the output of the first ROM 105 provided from the first ROM 105 via the latch circuit 109 and provides it to the latch circuit 116.

Moreover, to handle a case where neither of the ROMs 105 nor 106 is used, that is, a case where no correction is made, a delay circuit 114 is also provided for delaying the output of the latch circuit 110 to provide it to the latch circuit 117. Whether both of the ROMs 105 and 106 are used or only one of them is used or neither of them is used is determined by a mode selecting signal provided through an input terminal 127. The mode selecting signal is provided from an external central processing unit (CPU).

Subsequently, a feature will be described of an embodiment for making a toner color correction by a masking method in the electrophotographic copying machine.

It is possible to perform a calculation required for masking by the subsequently-described method. However, since a circuit of complicated arrangement is required if such a calculation is performed every time color correction is made, according to this embodiment, a correction table where the corrected Y, M and C output data are automatically determined on determination of the Y, M and C input data is previously formed and made into a ROM so as to enable color correction without any calculation process (that is, color correction data has already been stored in the form of a table in the above-mentioned ROMs 105 and 106). First, the formation of the color correction table will be explained.

In a single-color toner, generally, when the toner amount (the rate which the toner bears to a sheet of paper) is changed, the ratio among the reflection densities of R, G and B of the single-color toner is fixed regardless of the toner amount (proportional law).

For example, the following equation (4) is obtained when the toner amounts of magenta (M) are 70% and 80%:

$$[Dr70]/[Dr80]=[Dg70]/[Dg80]=[Db70]/[Db80]\ldots \quad (4)$$

wherein:

[Dr70] is a reflection density of R at an M toner amount of 70%;

[Dr80] is a reflection density of R at an M toner amount of 80%;

[Dg70] is a reflection density of G at an M toner amount of 70%;

[Dg80] is a reflection density of G at an M toner amount of 80%;

[Db70] is a reflection density of B at an M toner amount of 70%; and

[Db80] is a reflection density of B at an M toner amount of 80%.

On the other hand, when a color image copying by superpositioning each single-color toner is performed, the density of the duplication is equal to the sum of the reflection densities of R, G and B (arithmetical law).

By the proportional and arithmetical laws, the following reflection density color mixing equations (5) to (7) are obtained on condition that the density of a duplication is equal to that of an original:

$$Dr = [C] + mr[M] + yr[Y]\ldots \quad (5)$$

$$Dg = cg[C] + [M] + yg[Y]\ldots \quad (6)$$

$$Db = cb[C] + mb[M] + [Y]\ldots \quad (7)$$

wherein:

Dr is a reflection density of R of an original;

Dg is a reflection density of G of an original;

Db is a reflection density of B of an original;

mr is a reflection density ratio of R to the reflection density of G with respect to M;

mb is a reflection density ratio of B to the reflection density of G with respect to M;

yr is a reflection density ratio of R to the reflection density of B with respect to Y;

yg is a reflection density ratio of G to the reflection density of B with respect to Y;

cg is a reflection density ratio of G to the reflection density of R with respect to C; and cb is a reflection density ratio of B to the reflection density of R with respect to C.

Dr, Dg and Db are read-out by a color scanner including the scanning optical system 4, the condenser lens 5 and the light receiving device 6.

The following equations (8) to (10) are obtained by solving the above-mentioned reflection density color mixing equations (5) to (7) with respect to [C], [M] and [Y]:

$$[C] = a11Dr + a12Dg + a13Db \quad\quad (8)$$

$$[M] = a21Dr + a22Dg + a23Db \quad\quad (9)$$

$$[Y] = a31Dr + a32Dg + a33Db \quad\quad (10)$$

wherein the coefficients of a11 to a33 are determined as shown in the following equations (masking equations) (11) to (13):

$$[C] = 1.03Dr - 0.09Dg - 0.95Db \quad\quad (11)$$

$$[M] = -0.43Dr + 1.04Dg - 0.06Db \quad\quad (12)$$

$$[Y] = -0.15Dr - 0.24Dg + 1.06Db \quad\quad (13)$$

The reflection densities Dr, Dg and Db in the equations (11) to (13) are obtained by the following equations (14) to (16):

$$Dr = -\log_{10}[R] \quad\quad (14)$$

$$Dg = -\log_{10}[G] \quad\quad (15)$$

$$Db = -\log_{10}[B] \quad\quad (16)$$

wherein:

$$[R] = 1 - \{C\}/KC \quad\quad (17)$$

$$[G] = 1 - \{M\}/KM \quad\quad (18)$$

$$[B] = 1 - \{Y\}/KY \quad\quad (19)$$

wherein:

{C} is a main density of C toner before color correction;

{M} is a main density of M toner before color correction;

{Y} is a main density of Y toner before color correction; and

KC, KM and KY are tone numbers of the Y, M and C data, respectively.

The predetermined tone numbers KC, KM and KY are KC=KM=KY=255, since the Y, M and C data are conventionally inputted in 256-tone form. In this embodiment, however, when a correction table of the C data is formed, KC=255, KM=31 and KY=15; when a correction table of the M data is formed, KC=31, KM=255 and KY=15; and when a correction table of the Y data is formed, KC=15, KM=31 and KY=255.

As a result, the data amount per color in color correction is 256×32×16=131K byte.

Therefore, the masking equations (11) to (13) are equations where variables are {C}, {M} and {Y}. Moreover, in the process, low-order bits are deleted of toner data (sub toner data) other than main toner data (main color image data) substituted in the masking equations. That is, the bit numbers are allotted according to the values of the coefficients of the masking equations. Thereby, a correction calculation is performed while a substantial tone number is decreased to form a color correction table. For example, in a case of cyan, the bit numbers are determined according to the values of the coefficients 1.03, 0.09 and 0.05 in the equation (11). That is, 8 bits are allotted to the coefficient 1.03, 5 bits are allotted to the coefficient 0.09, and 4 bits are allotted to the coefficient 0.05. The data consists of 17 bits in total, wherein the main toner data consists of 8 bits and the sub toner data (sub color image data) consists of 5 or 4 bits.

In case of KC=KM=KY=255, it is also possible to allot 8 bits to the coefficient 1.03, 5 bits to the coefficient 0.09 and 4 bits to the coefficient 0.05 similarly to the above-described case by increasing the value of the color image data as 0, 1, 2, 3, ... with respect to the coefficient 1.03, as 0, 8, 16, 24 ... with respect to the coefficient 0.09, and as 0, 16, 32, 48 ... with respect to the coefficient 0.05.

In FIG. 3, {Y}, {M} and {C} which are yellow, magenta and cyan color image data, respectively, are inputted to input terminals 51, 52 and 53. These inputted image color data are, although are not limited to, of 8-bit form.

If a color correction table is formed in the ROM from the [C], [M] and [Y] obtained as described above, it is possible to output [C], [M] and [Y] which are read-out by the color scanner and corrected based on an address corresponding to the reflectances of R, G and B obtained by calculation.

If the sub toner data are 16-tone and 32-tone as described above, a calculation result is obtained which is slightly different from that obtained in the case where the calculation is performed based on a full data where each color is 256-tone. The difference is large especially at a data value such as gray scale where all of the Y, M and C data are remarkably varied.

Figure 5:
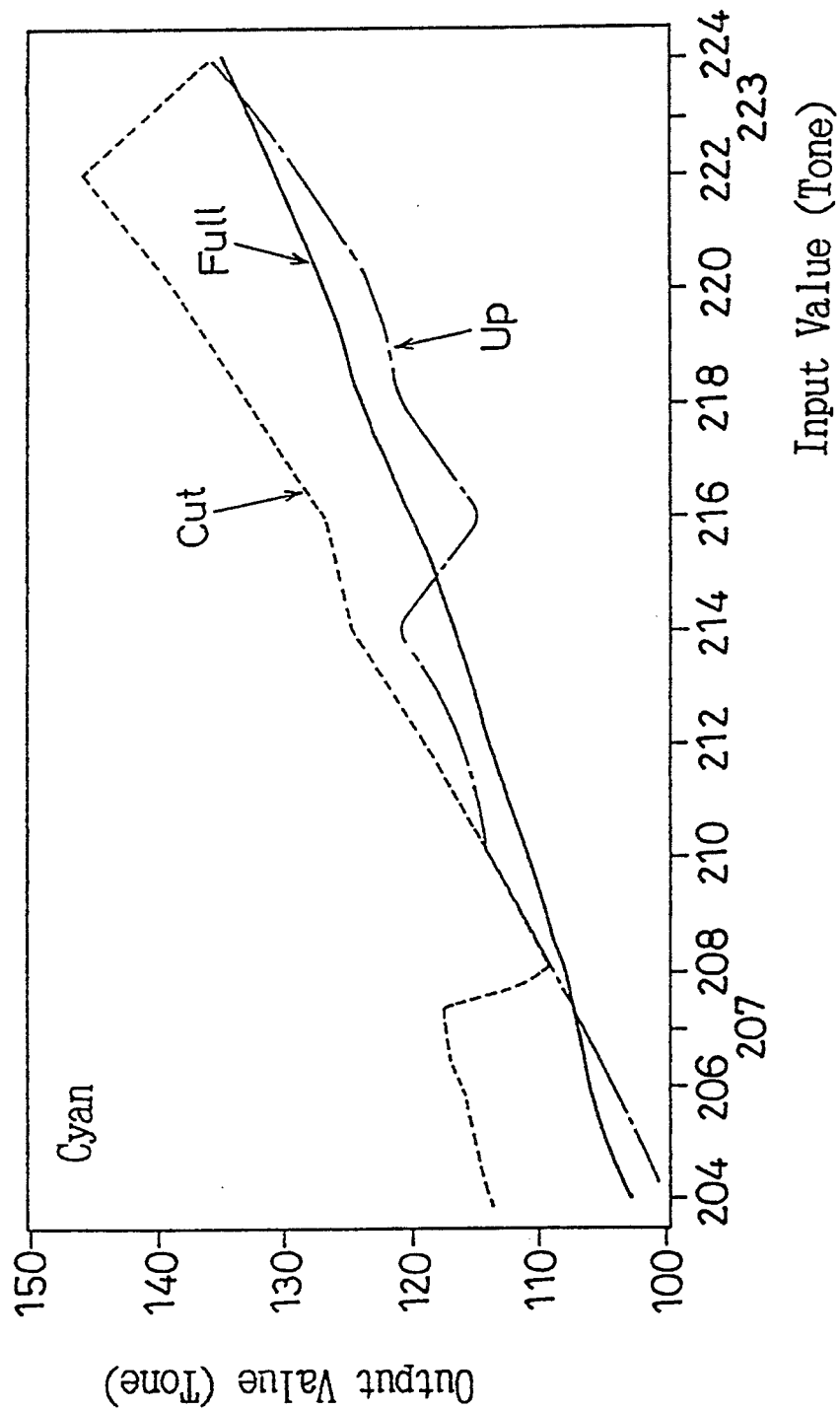
FIG. 5 is a graph showing results of color correction in the embodiment of the present invention and in a prior art.
Figure 6:
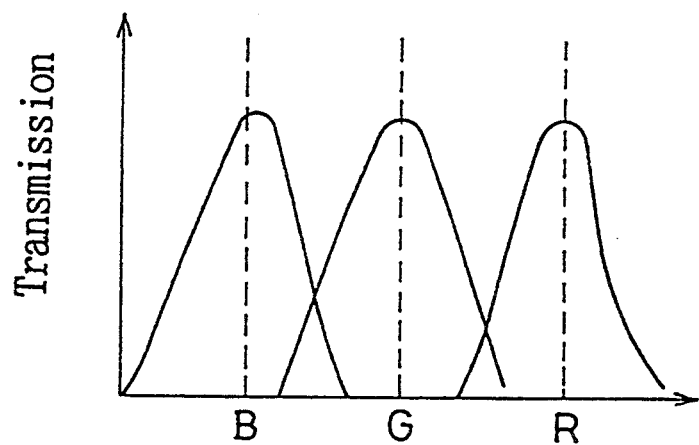
FIG. 6 is a graph showing spectral characteristics of a CCD constituting a color scanner applicable to the present invention.
Figure 7:
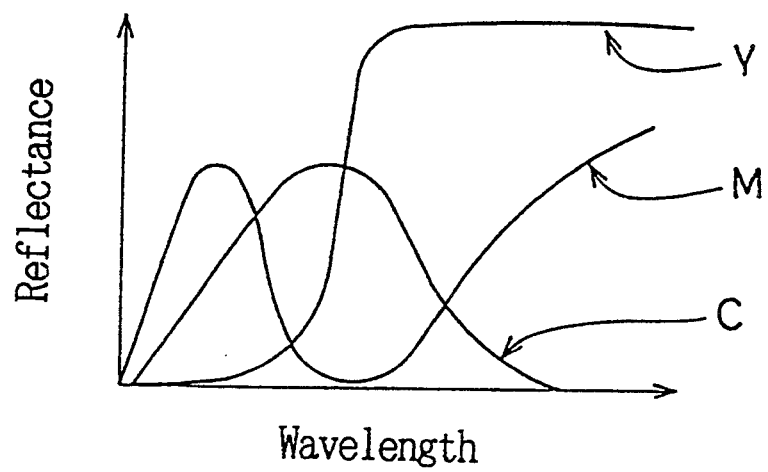
FIG. 7 is a graph showing spectral characteristics of toner applicable to the present invention.
Figure 8:
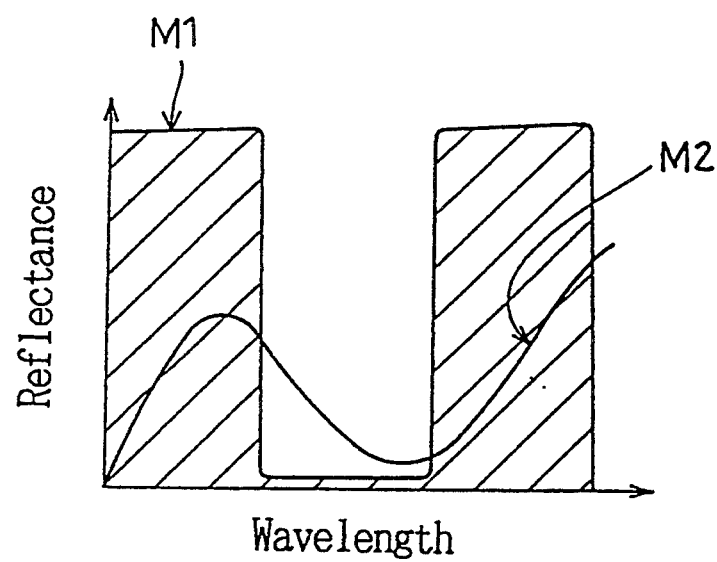
FIG. 8 is a graph showing spectral characteristics of magenta toner applicable to the present invention.

For example, in a model where all of the Y, M and C data are varied between 200 and 244 tones as shown by the dotted line "Cut" in FIG. 5 in a correction of Y, the output data is decreased by more than 10 tones at 207 and 223 tones. The 256 data of Y, M and C are read-in in 8-bit form, respectively. However, they are seemingly converted into 32 and 16 tones since only high-order 5 and 4 bits of the sub toner data are input when input to the color correction table as previously-described. Because of this, the value to be input into the masking equations largely jumps up when the data of 32 and 16 tones change, with a result that the calculation result thereof differs from the calculation result (solid line "Full") obtained in the case of the full data.

That is, in obtaining a table of C, the values of [G] and [B] approach 0 as the values of {M} and {Y} increase in the equations (18) and (19), and the values of Dg and Db rapidly increase as the values of [G] and [B] approach 0, that is, the larger the changes of [M] and [Y] are in the equations (15) and (16). Therefore, the above-mentioned difference is induced as shown in the dotted line "Cut" in FIG. 5 due to the minus coefficients by which Dg and Db are multiplied in the equation (11) represented by [C]=1.03Dr−0.09Dg−0.05Db.

To avoid this, it is desirable to count up (to round off) high-order data by one when the highest-order bit of the deleted low-order bits of the sub toner data is 1. The above-mentioned difference decreases as shown in the alternate long and short dash line "Up" in FIG. 5 by forming the color correction table by substituting the counted-up data in the correction equations (11) to (13). This is because {M} and {Y} which simultaneously vary before the above counting-up stop simultaneously varying due to the counting-up as shown by {C} marked with a # in Table 3 to be shown later.

For the above counting-up, circuits (the increment determining circuits 128 and 129 of FIG. 4) are employed where the bit number is further increased by one in order to count up the high-order data by one when the highest-order bit of the deleted low-order bits of the sub toner data is 1.

Each data of Table 1 corresponds to FIG. 5. In Table 1, "Full" shows output values of [C] calculated by use of the full data with respect to each of the input values {C}, {M} and {Y} inputted from the color scanner, "Cut" shows output values of [C] calculated by deleting low-order bits with respect to the sub data {M} and {Y} and by use of the full data with respect to the main data {C}, and "Up" shows output values of [C] calculated by use of the counted-up data with respect to {M} and {Y} and by use of the full data with respect to {C}.

Table 2 shows a correspondence relation among 8-bit {C}, 5-bit {M}, 4-bit {Y} and the tone numbers (KC=255, KM=31 and KY=15) determined according to the values of the coefficients of the equation (11) when the correction table of C is formed in correspondence with the above-mentioned output value "Cut".

Tables 3 shows a correspondence relation among 8-bit {C}, 5-bit {M}, 4-bit {Y} and the tone numbers (KC=255, KM=31 and KY=15) determined according to the values of the coefficients of the equation (11) when the correction table of C is formed in correspondence with the above-mentioned output value "Up". In the tables, the values of C marked with a * are the values obtained when {M} varies, and the values marked with a Δ are the values obtained when {Y} varies.

Table 4 shows a correspondence relation among the values of {C} marked with a • and Δ and the values of {M} and {Y} in Table 3.

When the highest-order bit of the deleted low-order bits of the sub toner data is 1, the high-order data are counted-up (rounded off) by one and the color correction table is formed by substituting the counted-up data in the correction equations (11) to (13), with a result that {M} and {Y} stop simultaneously varying and the inducement of the above-mentioned difference is restrained. That is, the dispersion of the variation of {M} and {Y} due to the above counting-up restrains the above-mentioned difference to be small.

Moreover, as is understood from Table 4, the variation due to the above counting-up represented by the alternate long and short dash line "Up" is in accordance with the solid line "Full".

For example, at {C}=204 to 220 almost corresponding to FIG. 5, {M} and {Y} vary at C=216. This is because the variation rates of {M} (1/31) and {Y} (1/15) are different.

As described above, if a corrected color image data is calculated by solving a masking equation by allotting the tone number of an input image data according to the value of each coefficient, of the reflection densities of three primary colors, constituting the masking equation, the number of color image data per color decreases. Consequently, a toner color correction can be made by use of a small-capacity memory with image reproducibility being hardly deteriorated.

As a result, the cost can be reduced and the arrangement of the circuit can be simplified without the reduction of the masking process speed being induced.

By storing the color image data corrected as described above in the address, corresponding to the tone number, of the ROMs 105 and 106 in the form of a color correction table, it is unnecessary to execute the above-described calculation process every time the color correction is made. As a result, a nearly real time color correction is possible.

Moreover, if, in order to decrease the tone number, low-order bits of the sub color image data are deleted and the data values of high-order bits of the sub color image data is increased by one when the highest-order bit of the low-order bits is 1, a color correction can be realized which is substantially equal to that of a case where the tone number of the sub color image data is equal to the tone number of the main color image data, and a large-capacity memory is used.

However, since, in image forming apparatuses, various conditions (the conditions of development, a photoreceptor drum, a charge coupled device (CCD) serving as a light receiving device) slightly differ according to types and even in the same type, differ according to each apparatus, the difference of condition cannot always appropriately be coped with only by the data stored in the ROM.

An embodiment where, in order to solve such a problem, fine adjustment of a color image data can be made before the color image data is provided to the correcting circuits 57, 58 and 59 of FIG. 3 will hereinafter be described with reference to FIGS. 9 to 11.

Figure 9:
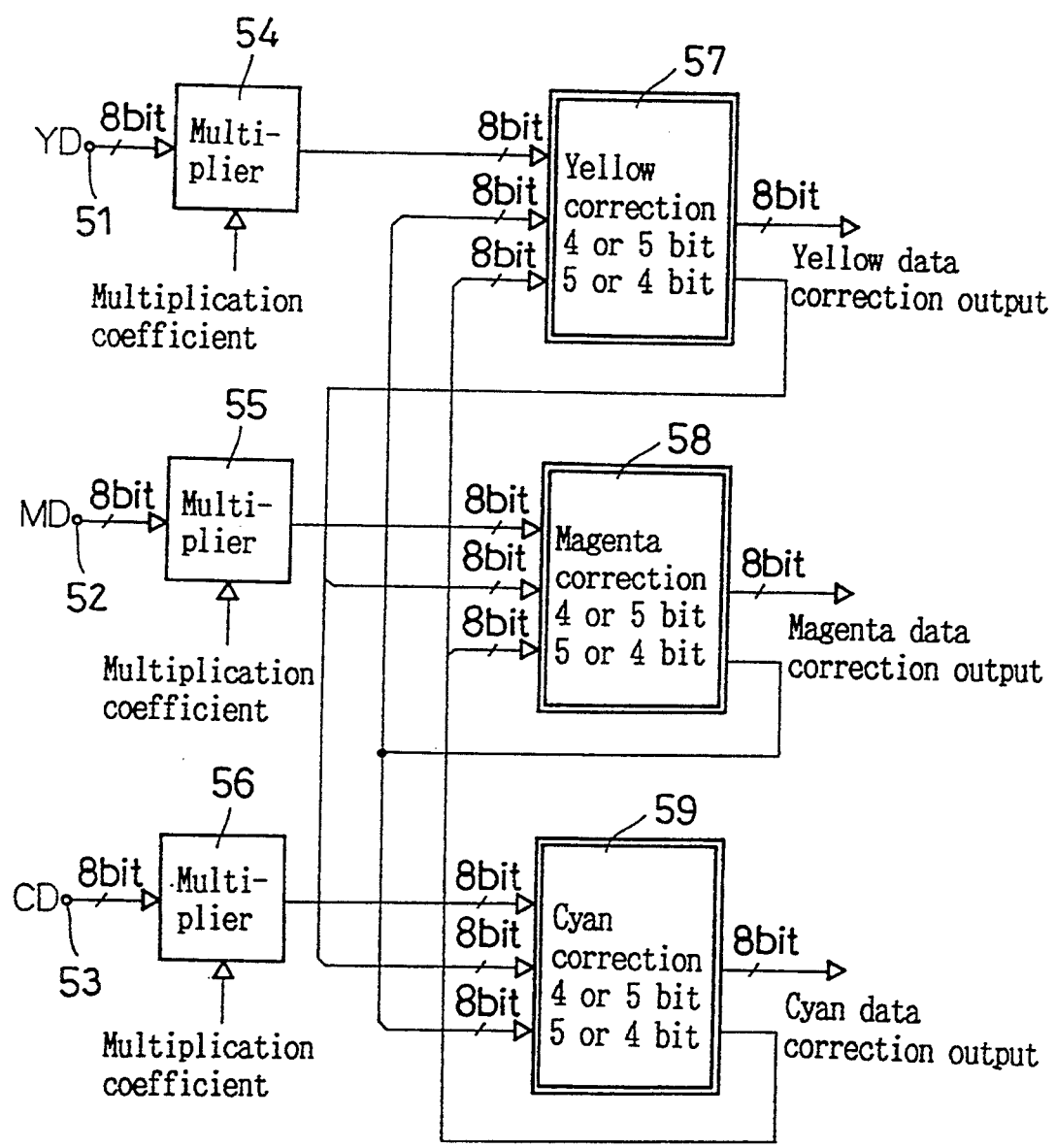
FIG. 9 is a block diagram of another embodiment of a data correcting circuit according to the present invention.

In FIG. 9, some portions are identified by the same reference designations which are used in FIG. 3. The embodiment of FIG. 9 is different from the circuit of FIG. 3 in that it has multipliers 54, 55 and 56 for fine adjustment of the color image data YD, MD and CD inputted through the input terminals 51, 52 and 53. Multiplication coefficients of these Y multiplier 54, M multiplier 55 and C multiplier 56 are 1.0, respectively, as shown in Table 5 when the main color is yellow Y (that is, when the laser beam forms a latent image based on the yellow color image data). When the main color is magenta (that is, when the laser beam forms a latent image based on the magenta color image data), they are 1.2, 1.0 and 0.9, respectively. When the main color is cyan (that is, when the laser beam forms a latent image based on the cyan color image data), they are 1.0, 1.0 and 0.8, respectively.

Figure 10:
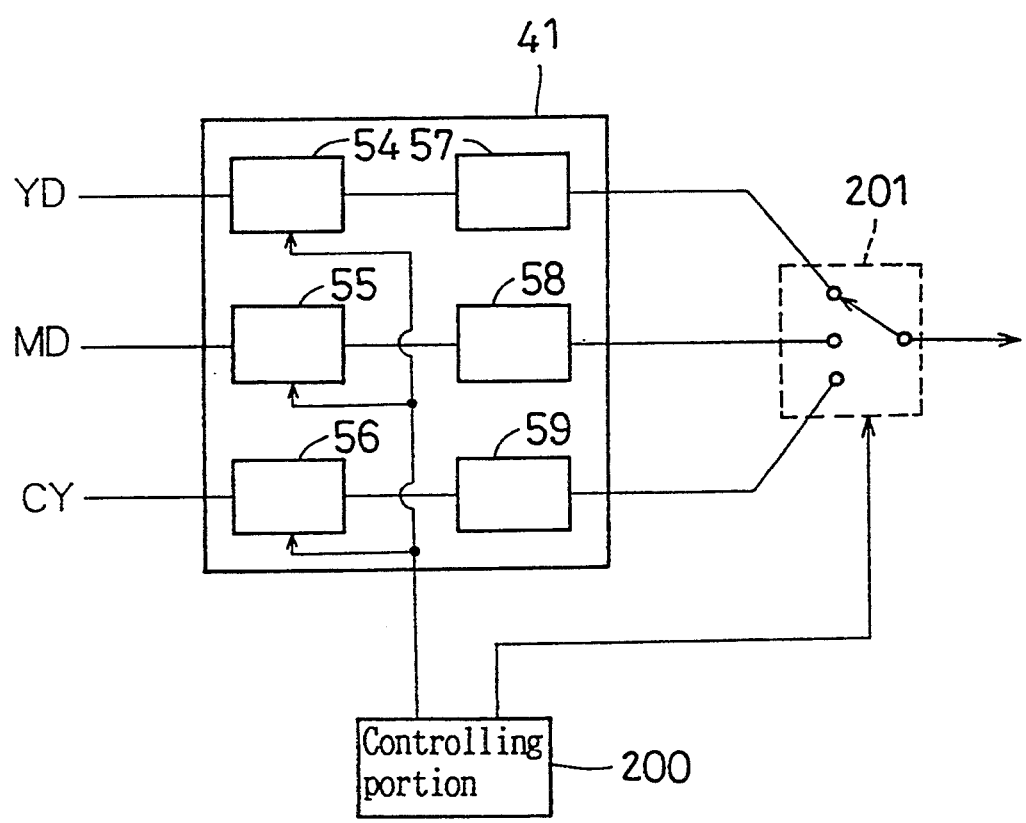
FIG. 10 is a block diagram showing a multiplication coefficient changeover setting circuit of the multipliers of FIG. 9.

The setting of change-over of the coefficients is made by a controlling portion 200 comprising a CPU shown in FIG. 10. Since the controlling portion 200 selectively changes-over through a switch 201 the color image data (the main color image data) for driving the laser beam, it is easy to apply the multiplication coefficient to the main color image data. As is understood from the explanation of FIG. 1, the color image data for controlling the laser beam is an image data of one color. In forming a full-color image, four similar image forming operations are performed including an operation for forming a black image. The change-over switch 201 precedes, for example, the pulse generating circuit 11.

Table 6 shows set coefficients of a register (arranged between the CPU and a multiplier) at each magnification MAG. For example, when the magnification is 1.2, the value is set to 153 in decimal system and to 99H in hexacode. Table 7 shows maximum values of the color image data in multiplications of 1.1 to 1.9 times. In other words, Table 7 indicates that the coefficient is controlled so that, when a color image data whose value is to exceed the maximum value is inputted, a result is obtained which is the same as the case where a data of the maximum value is inputted. In Tables 6 and 7, DEC and HEX represent decimal system and hexacode, respectively.

Subsequently, a feature for limiting an output data value when the value of a color image data inputted to the multiplier 54 exceeds the maximum value will be described with reference to FIG. 11. In the figure, the yellow color image data YD is inputted to the multiplier 54. When the value of the color image data YD is within the maximum value shown in Table 7, the output of the multiplier is outputted to a line 300 in 8-bit form. When it exceeds the maximum value, a carry of the output data is executed so that the ninth bit is outputted to the line 301 (the level of a line 301 is "1" which is a high level). As a result, a signal on the line 301 is provided via an inverter 302 to a latch circuit 303, and a maximum output data value which is previously provided (an output data value corresponding to the maximum value) is outputted from the latch circuit 303 to a line 305. When this happens, the other latch circuit 304 is disabled since it is provided with "1" via the line 301, with a result that no data is outputted through the latch circuit 304.

When a color image data not exceeding the maximum value is inputted, the operations of the latch circuits 303 and 304 are reversed. That is, the color image data is outputted from the line 300 via the latch circuit 304 to the line 305, and the previously-provided maximum output data value is not outputted from the latch circuit 303. Thus, when a color image data exceeding the maximum value is input, the color image data is output after limited by the predetermined maximum output data value.

An explanation has been given with respect to the multiplier 54 for the yellow color image data with reference to FIG. 11. The multipliers 55 and 56 for the magenta and cyan color image data have similar arrangements.

According to the above-described embodiment of FIG. 9, a color correction data previously stored in the ROMs 105 and 106 is read-out according to the value of an input color image data. In this case, since the input color image data is corrected into a value suitable for the condition of each image forming apparatus by being multiplied by use of a predetermined multiplication coefficient by a multiplier before the reading-out, an exact correction is realized which is in accordance with each image forming apparatus.

TABLE 1

| Input value | Full | Cut | Up |
| --- | --- | --- | --- |
| 200 | 98 | 103 | 92 |
| 202 | 101 | 107 | 96 |
| 204 | 103 | 114 | 100 |
| 206 | 106 | 116 | 104 |
| 208 | 108 | 109 | 109 |
| 210 | 111 | 114 | 114 |
| 212 | 114 | 119 | 116 |
| 214 | 117 | 125 | 121 |

TABLE 1-continued

| Input value | Full | Cut | Up |
| --- | --- | --- | --- |
| 216 | 120 | 127 | 115 |
| 218 | 124 | 133 | 121 |
| 220 | 127 | 139 | 123 |
| 222 | 131 | 146 | 129 |
| 224 | 135 | 136 | 136 |

TABLE 2

| 8 bit | {C} (8 bit) | {M} (5 bit) | {Y} (4 bit) |
| --- | --- | --- | --- |
| 00000000 | 0 | 0 | 0 |
| 00000001 | 1 | 0 | 0 |
| 00000010 | 2 | 0 | 0 |
| 00000011 | 3 | 0 | 0 |
| 00000100 | 4 | 0 | 0 |
| 00000101 | 5 | 0 | 0 |
| 00000110 | 6 | 0 | 0 |
| 00000111 | 7 | 0 | 0 |
| 00001000 | 8 | 1 | 0 |
| 00001001 | 9 | 1 | 0 |
| 00001010 | 10 | 1 | 0 |
| 00001011 | 11 | 1 | 0 |
| 00001100 | 12 | 1 | 0 |
| 00001101 | 13 | 1 | 0 |
| 00001110 | 14 | 1 | 0 |
| 00001111 | 15 | 1 | 0 |
| 00010000 | 16 | 2 | 1 |
| 00010001 | 17 | 2 | 1 |
| 00010010 | 18 | 2 | 1 |
| 00010011 | 19 | 2 | 1 |
| : | : | : | : |
| : | : | : | : |
| 11111111 | 255 | 3 1 | 1 5 |

TABLE 3

| 8 bit | {C} (8 bit) | {M} (5 bit) | | {Y} (4 bit) | |
| --- | --- | --- | --- | --- | --- |
| | | Cut | Up | Cut | Up |
| 00000000 | 0 | 0 | 0 | 0 | 0 |
| 00000001 | 1 | 0 | 0 | 0 | 0 |
| 00000010 | 2 | 0 | 0 | 0 | 0 |
| 00000011 | 3 | 0 | 0 | 0 | 0 |
| 00000100 | 4* | 0 | 1 | 0 | 0 |
| 00000101 | 5 | 0 | 1 | 0 | 0 |
| 00000110 | 6 | 0 | 1 | 0 | 0 |
| 00000111 | 7 | 0 | 1 | 0 | 0 |
| 00001000 | 8 Δ | 1 | 1 | 0 | 1 |
| 00001001 | 9 | 1 | 1 | 0 | 1 |
| 00001010 | 1 0 | 1 | 1 | 0 | 1 |
| 00001011 | 1 1 | 1 | 1 | 0 | 1 |
| 00001100 | 1 2* | 1 | 2 | 0 | 1 |
| 00001101 | 1 3 | 1 | 2 | 0 | 1 |
| 00001110 | 1 4 | 1 | 2 | 0 | 1 |
| 00001111 | 1 5 | 1 | 2 | 0 | 1 |
| 00010000 | 1 6# | 2 | 2 | 1 | 1 |
| 00010001 | 1 7 | 2 | 2 | 1 | 1 |
| 00010010 | 1 8 | 2 | 2 | 1 | 1 |
| 00010011 | 1 9 | 2 | 2 | 1 | 1 |
| 00010100 | 2 0* | 2 | 3 | 1 | 1 |
| 00010101 | 2 1 | 2 | 3 | 1 | 1 |
| 00010110 | 2 2 | 2 | 3 | 1 | 1 |
| 00010111 | 2 3 | 2 | 3 | 1 | 1 |
| 00011000 | 2 4 Δ | 3 | 3 | 1 | 2 |
| 00011001 | 2 5 | 3 | 3 | 1 | 2 |
| 00011010 | 2 6 | 3 | 3 | 1 | 2 |
| 00011011 | 2 7 | 3 | 3 | 1 | 2 |
| 00011100 | 2 8* | 3 | 4 | 1 | 2 |
| 00011101 | 2 9 | 3 | 4 | 1 | 2 |
| 00011110 | 3 0 | 3 | 4 | 1 | 2 |
| 00011111 | 3 1 | 3 | 4 | 1 | 2 |
| 00100000 | 3 2# | 4 | 4 | 2 | 2 |
| 00100001 | 3 3 | 4 | 4 | 2 | 2 |
| 00100010 | 3 4 | 4 | 4 | 2 | 2 |
| 00100011 | 3 5 | 4 | 4 | 2 | 2 |
| 00100100 | 3 6* | 4 | 5 | 2 | 2 |
| 00100101 | 3 7 | 4 | 5 | 2 | 2 |
| 00100110 | 3 8 | 4 | 5 | 2 | 2 |

TABLE 3-continued

| 8 bit | {C} (8 bit) | {M} (5 bit) Cut | {M} (5 bit) Up | {Y} (4 bit) Cut | {Y} (4 bit) Up |
|---|---|---|---|---|---|
| 00100111 | 3 9 | 4 | 5 | 2 | 2 |
| 00101000 | 4 0 Δ | 5 | 5 | 2 | 3 |
| 00101001 | 4 1 | 5 | 5 | 2 | 3 |

TABLE 4

| {C} | {M} | {C} | {Y} |
|---|---|---|---|
|  | 0 |  |  |
| 4 |  |  | 0 |
|  | 1 | 8 |  |
| 12 |  |  |  |
|  | 2 |  | 1 |
| 20 |  |  |  |
|  | 3 | 24 |  |
| 28 |  |  |  |
|  | 4 |  | 2 |
| 36 |  |  |  |
|  | 5 | 40 |  |
| 44 |  |  |  |
|  | 6 |  | 3 |
| 52 |  |  |  |
|  | 7 | 56 |  |
| 60 |  |  |  |
|  | 8 |  | 4 |
| 68 |  |  |  |
|  | 9 | 72 |  |
| 76 |  |  | 5 |
| : | 10 | : | : |
| : | 24 | : | : |
| 196 |  |  | 12 |
|  | 25 | 200 |  |
| 204 |  |  |  |
|  | 26 |  | 13 |
| 212 |  |  |  |
|  | 27 | 216 |  |
| 220 |  |  |  |
|  | 28 |  | 14 |
| 228 |  |  |  |
|  | 29 | 232 |  |
| 236 |  |  |  |
|  | 30 |  | 15 |
| 244 |  |  |  |
|  | 31 | 248 |  |
| 252 |  |  |  |
|  | 32 |  | 16 |

TABLE 5

| Coefficient | KY | KM | KC |
|---|---|---|---|
| Main Y data | 1.0 | 1.0 | 1.0 |
| Main M data | 1.2 | 1.0 | 0.9 |
| Main C data | 1.0 | 1.0 | 0.8 |

TABLE 6

Coefficients of Register at Each Magnification

| MAG | 0.1 | 0.2 | 0.3 | 0.4 | 0.5 | 0.6 | 0.7 | 0.8 | 0.9 | 1.0 |
|---|---|---|---|---|---|---|---|---|---|---|
| DEC | 12 | 25 | 38 | 51 | 64 | 76 | 89 | 102 | 115 | 128 |
| HEX | 0CH | 19H | 26H | 33H | 40H | 4CH | 59H | 66H | 73H | 80H |

| MAG | 1.1 | 1.2 | 1.3 | 1.4 | 1.5 | 1.6 | 1.7 | 1.8 | 1.9 |
|---|---|---|---|---|---|---|---|---|---|
| DEC | 140 | 153 | 166 | 179 | 192 | 204 | 217 | 230 | 243 |
| HEX | 8CH | 99H | A6H | B3H | C0H | CCH | D9H | E6H | F3H |

TABLE 7

Maximum Data Values at 1.1 to 1.9 Times

| MAG | 1.1 | 1.2 | 1.3 | 1.4 | 1.5 | 1.6 | 1.7 | 1.8 | 1.9 |
|---|---|---|---|---|---|---|---|---|---|
| DEC | 232 | 213 | 196 | 182 | 170 | 159 | 150 | 142 | 134 |
| HEX | E8H | D5H | C4H | B6H | AAH | 9FH | 96H | 8EH | 86H |

Obviously, many modifications and variations of the present invention are possible in light of the above teachings. It is therefore to be understood that within the scope of the appended claims, the invention may be practiced other than as specifically described.

What is claimed is:

1. A method for correcting color image data which includes first color data, second color data, and third color data indicative of three primary colors for use in a color image forming apparatus, said method comprising the steps of:

calculating color image data;

correcting the calculated color image data by solving a masking equation and by allotting a different tone number to the first, second and third color data according to a reflection density coefficient value associated with each of the three primary colors in the masking equation.

2. A color correcting method for use in a color image forming apparatus according to claim 1, wherein said corrected color image data are stored as a color correction table at an address, which is in accordance with said tone number, of a semiconductor memory device.

3. A method for correcting color image data which includes first color data, second color data, and third color data indicative of three primary colors for use in a color image forming apparatus, said method comprising the steps of:

calculating color image data;

correcting the calculated color image data by solving a masking equation; and allotting a different tone number to the first, second and third color data according to a reflection density coefficient value associated with each of the three primary colors in the masking equation, wherein the tone number is decreased by deleting low-order bits for color image data having a coefficient other than a coefficient having a highest value among said coefficients, and when a highest-order bit of deleted low-order bits is 1, the data values of high-order bits of said color image data, corresponding to a coefficient other than a coefficient having a highest value among said coefficients, are increased by one.

4. A color image forming apparatus comprising:

a semiconductor memory device for storing color image data at an address in accordance with tone numbers associated with the color image data, the color image data being corrected by solving a masking equation and by allotting different tone numbers for input image data according to reflection density coefficient values associated with each of three primary colors in accordance with the masking equation;

means for producing address signals corresponding to said tone numbers from main color image data and other color image data inputted; and means for reading-out color image data from said semiconductor memory device by use of said address signals and outputting the color image data.

5. A color image forming apparatus comprising:
means for calculating color image data;
means for correcting calculated color image data said correcting means also allotting input image data tone numbers according to a reflection density coefficient value associated with each of the three primary colors in the masking equation;
means for deleting low-order bits for color image data having a coefficient other than a coefficient having a highest value among said coefficients in order to decrease the tone number associated with said color image data; and
a circuit for increasing the data values of high-order bits of said color image data corresponding to a coefficient other than a coefficient having a highest value among said coefficients by one when a highest-order bit of the deleted low-order bits is 1.

6. A color image forming apparatus comprising:
a semiconductor memory device in which color image data is stored, wherein the color image data has been corrected by solving a masking equation and by allotting a different tone number to input image data according to reflection density coefficient values associated with each of three primary colors in accordance with the masking equation, and wherein the color image data are stored at an address which depends upon said tone numbers;
reading-out means for reading-out color correction table data from said semiconductor memory device by use of table data from said semiconductor memory device by use of inputted color image data as an address signal;
image forming means for forming an image by use of the color correction table data read-out by said reading-out means; and
fine adjustment means for finely adjusting the inputted color image data before the inputted color image data are provided to said semiconductor memory device.

7. A color image forming apparatus according to claim 6, wherein said fine adjustment means comprises a multiplier having a predetermined multiplication coefficient.

8. A color image forming apparatus according to claim 7, wherein limiting means is provided for limiting output data of the multiplier so that, when color image data are inputted whose value exceeds the maximum value of the inputted color image data determined by the multiplication coefficient, data are outputted which have a value equal to the value of data outputted when the inputted color image data having the maximum value are inputted.

9. A color image forming apparatus according to claim 6, wherein said fine adjustment means is provided for each of the color image data of the three primary colors.

10. A color image forming apparatus according to claim 9, wherein said fine adjustment means comprises a multiplier having a predetermined multiplication coefficient.

11. A color image forming apparatus according to claim 10, wherein said multiplier comprises a multiplier for yellow data, a multiplier for magenta data and a multiplier for cyan data and wherein each multiplier has a predetermined coefficient.

12. A color image forming apparatus according to claim 11, wherein the multiplication coefficient of each multiplier is 1.0 when the main color is yellow.

13. A color image forming apparatus according to claim 11, wherein the multiplication coefficients of the multiplier for yellow data, the multiplier for magenta data and the multiplier of cyan data are 1.2, 1.0 and 0.9, respectively, when the main color is magenta.

14. A color image forming apparatus according to claim 11, wherein the multiplication coefficients of the multiplier for yellow data, the multiplier for magenta data and the multiplier for cyan data are 1.0, 1.0 and 0.8, respectively, when the main color is cyan.

* * * * *